(No Model.) 10 Sheets—Sheet 1.

G. G. KIMMELL.
CORN HARVESTER AND SHOCKER.

No. 481,036. Patented Aug. 16, 1892.

FIG. 1.

WITNESSES:
J. Henry Kaiser
Milford W. Rider

INVENTOR.
Granger G. Kimmell
BY Alex J. Stewart
Assoc. ATTORNEY.

(No Model.) 10 Sheets—Sheet 2.

G. G. KIMMELL.
CORN HARVESTER AND SHOCKER.

No. 481,036. Patented Aug. 16, 1892.

FIG. 2.

WITNESSES:
J. Henry Kaiser
Milford W. Rider

INVENTOR,
Granger G. Kimmell
BY
Alex J. Stewart
Associate ATTORNEY.

(No Model.) 10 Sheets—Sheet 5.
G. G. KIMMELL.
CORN HARVESTER AND SHOCKER.

No. 481,036. Patented Aug. 16, 1892.

FIG. 5.

WITNESSES:
J. Henry Kaiser.
M. W. Rider.

INVENTOR,
Granger G. Kimmell
BY
ATTORNEY.

(No Model.) 10 Sheets—Sheet 7.
G. G. KIMMELL.
CORN HARVESTER AND SHOCKER.

No. 481,036. Patented Aug. 16, 1892.

WITNESSES:
J. Henry Kaiser
Mm.R.Rider

INVENTOR:
Granger G. Kimmell
BY
Aly J Stewart
Associate ATTORNEY.

(No Model.) 10 Sheets—Sheet 8.
G. G. KIMMELL.
CORN HARVESTER AND SHOCKER.

No. 481,036. Patented Aug. 16, 1892.

WITNESSES:
J. Henry Kaiser
M. W. Rider

INVENTOR,
Granger G. Kimmell
BY
Aly J Stewart
Associate ATTORNEY.

(No Model.) 10 Sheets—Sheet 9.

G. G. KIMMELL.
CORN HARVESTER AND SHOCKER.

No. 481,036. Patented Aug. 16, 1892.

(No Model.) 10 Sheets—Sheet 10.
G. G. KIMMELL.
CORN HARVESTER AND SHOCKER.

No. 481,036. Patented Aug. 16, 1892.

Witnesses
Inventor

UNITED STATES PATENT OFFICE.

GRANGER G. KIMMELL, OF FARMER, ASSIGNOR OF ONE-FOURTH TO WILBER W. KIMMELL, OF BRYAN, OHIO.

CORN HARVESTER AND SHOCKER.

SPECIFICATION forming part of Letters Patent No. 481,036, dated August 16, 1892.

Application filed October 30, 1890. Serial No. 369,835. (No model.)

*To all whom it may concern:*

Be it known that I, GRANGER G. KIMMELL, of Farmer township, in the county of Defiance and State of Ohio, have invented certain new and useful Improvements in Corn Harvesters and Shockers; and I do hereby declare the following to be a full, clear, and exact description of the same, reference being had to the accompanying drawings, forming a part of this specification, and to the letters of reference marked thereon.

This invention has for its object to provide a machine which will at once cut corn standing in the field, gather the same into bundles with the butt-ends evenly disposed, such bundles being of a size to form a shock adapted to stand erect by itself, and finally to automatically stand the bundle on the ground in erect position and ready to be bound together in the ordinary manner, the whole being thrown into operation by the driver and the power being derived from the ground-wheel as the machine is driven forward over the field being harvested.

Primarily and broadly stated the invention may be said to consist in a corn-harvesting machine having a cutting mechanism and a bundling or shocking mechanism adapted to receive the cornstalks from the cutting mechanism, and when a sufficient quantity has been received to compress the bundle, stand the same on end, and at the same time releasing the bundle or shock, as it then becomes, from the machine, leaving it in upright position and ready to be tied in the ordinary manner.

The invention consists, further, in certain individual features and combinations and arrangements of parts to be hereinafter described, and pointed out particularly in the claims at the end of this specification, which are particularly adapted for use and application in the particular machine herein shown and described, but which are capable of use individually to accomplish certain specified results in other relations, all as will now more fully appear.

Referring to the accompanying drawings illustrating my invention, Fig. 4 is a perspective view of the mechanism controlling the bundling or shocking mechanism. Fig. 4ª is a detail of the foot-lever broken away from Fig. 4 for want of room on the sheet. Fig. 6ª is a detail section of the grain-table and retainers. Fig. 6ᵇ is a detail of the mechanism for operating the lower arms of the barrel, the barrel being in a vertical position and the frame dropped. Fig. 10 is a plan view of the cutting device and drive mechanism therefor.

Similar letters of reference in the several figures indicate the same parts.

Generally speaking, the present machine may be divided into three mechanisms—to wit, a cutting mechanism, a conveying and retaining mechanism, which carries the stalks from the cutter to the shocking mechanism and retains the same until the latter mechanism is in position to receive them, and a bundling or shocking mechanism for receiving the stalks individually and forming them into bundles of proper size for shocks, then operating to stand the shocks on end and clear them from the machine, all of which mechanisms, together with certain details to be presently described, are associated and operated in certain relations to and controlled by each other to accomplish the desired end, but are independently driven from the main driving mechanism, and to this extent are independent.

Figures 11, 12:
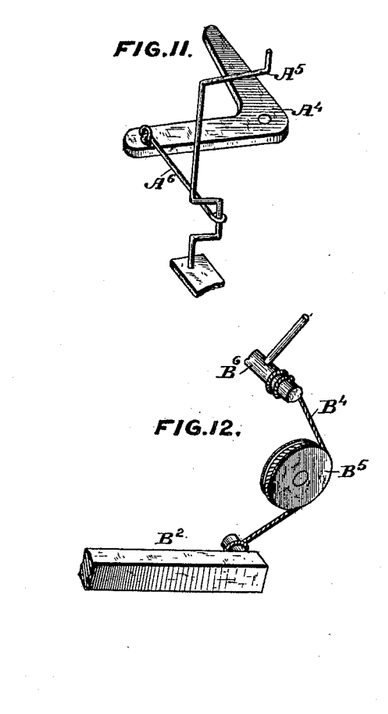
Fig. 11 is a detail of the bell-crank controlling the clutch between the main-drive axle and ground-wheel.
Fig. 12 is a detail of the elevating device for the cutting-frame and conveyer-table.
Figures 13, 14:
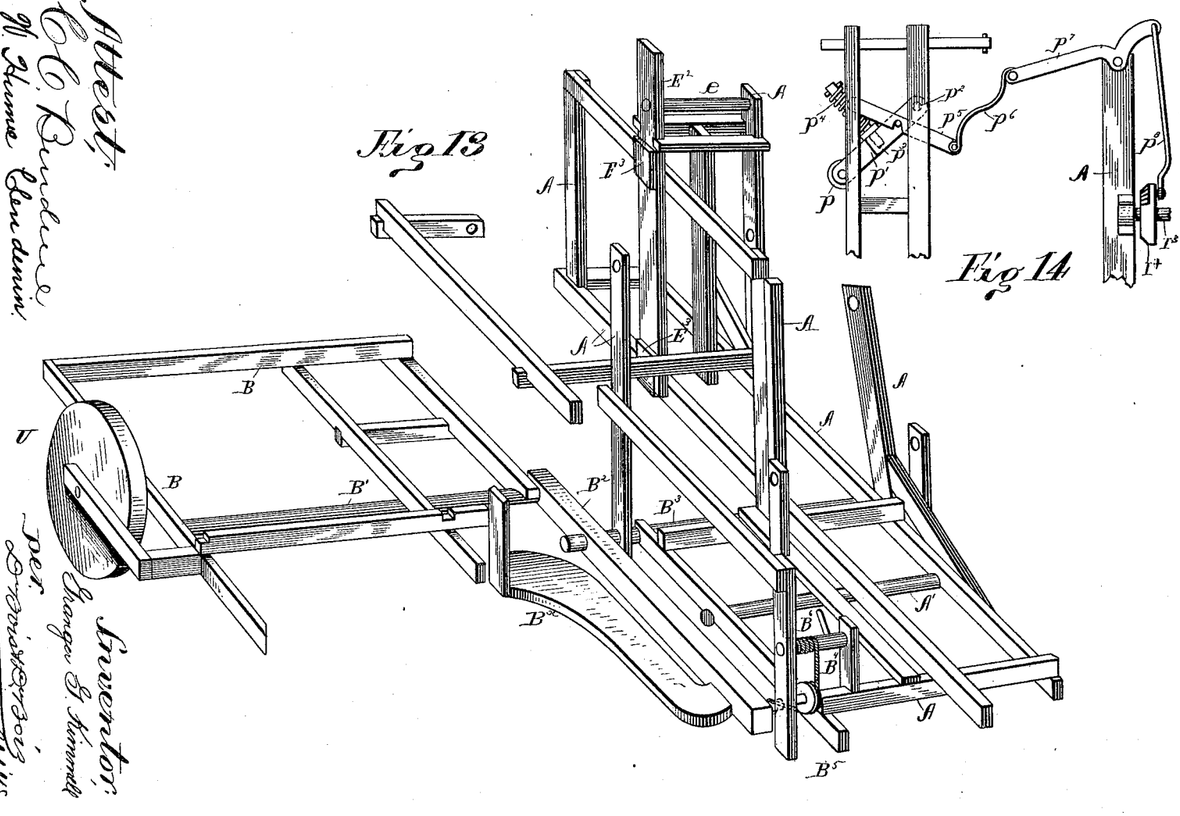
Fig. 13 is a perspective view of the preferred form of main framing, the view being particularly designed to illustrate the connection between the main frame and cutter and conveyer-frame.
Fig. 14 is a detail view of the mechanism for releasing the feeding blades or fingers.
Figure 15:
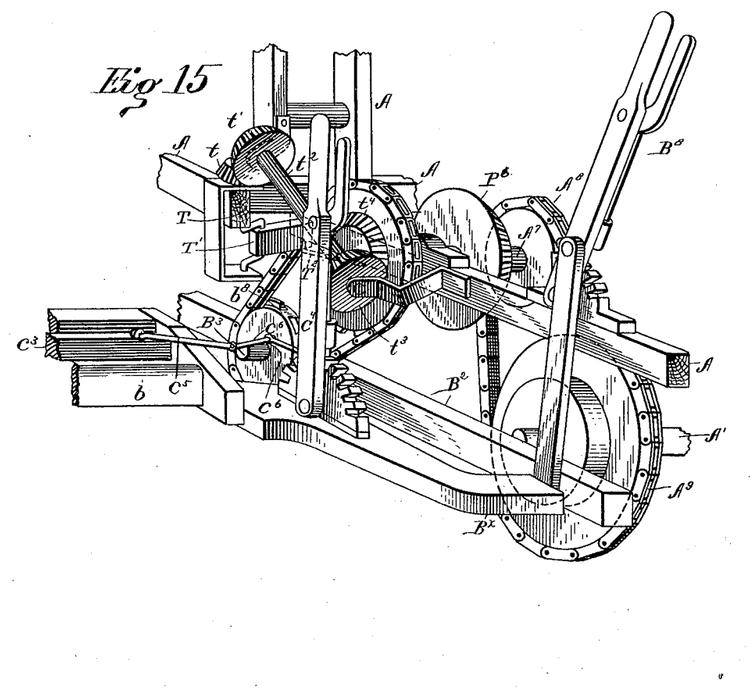
Fig. 15 is a front perspective view of a portion of the machine, showing the manner of transmitting power from the main shaft to the different parts of the machine, and also showing the means for raising and lowering the cutting-frame.

The letter A in the drawings indicates the main frame, in which is journaled the main drive-shaft $A'$, carrying the drive or ground wheel $A^2$, which is connected to the shaft by a clutch or ratchet device $A^3$ under the control of the driver, the movable member being connected to the end of bell-crank lever $A^4$, Fig. 11, and moved into or out of engagement by the crank-handle $A^5$ and link $A^6$.

Figure 1:
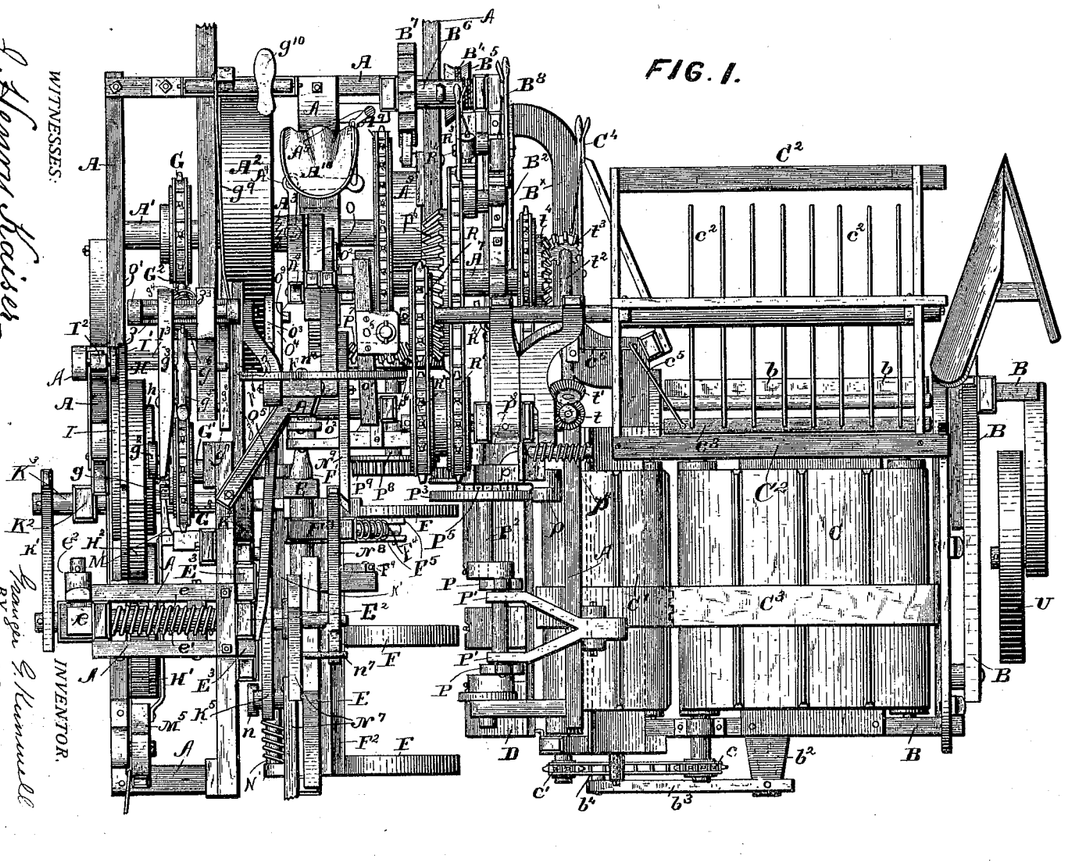
Figure 1 is a top plan view of a machine constructed in accordance with my invention.
Figure 2:
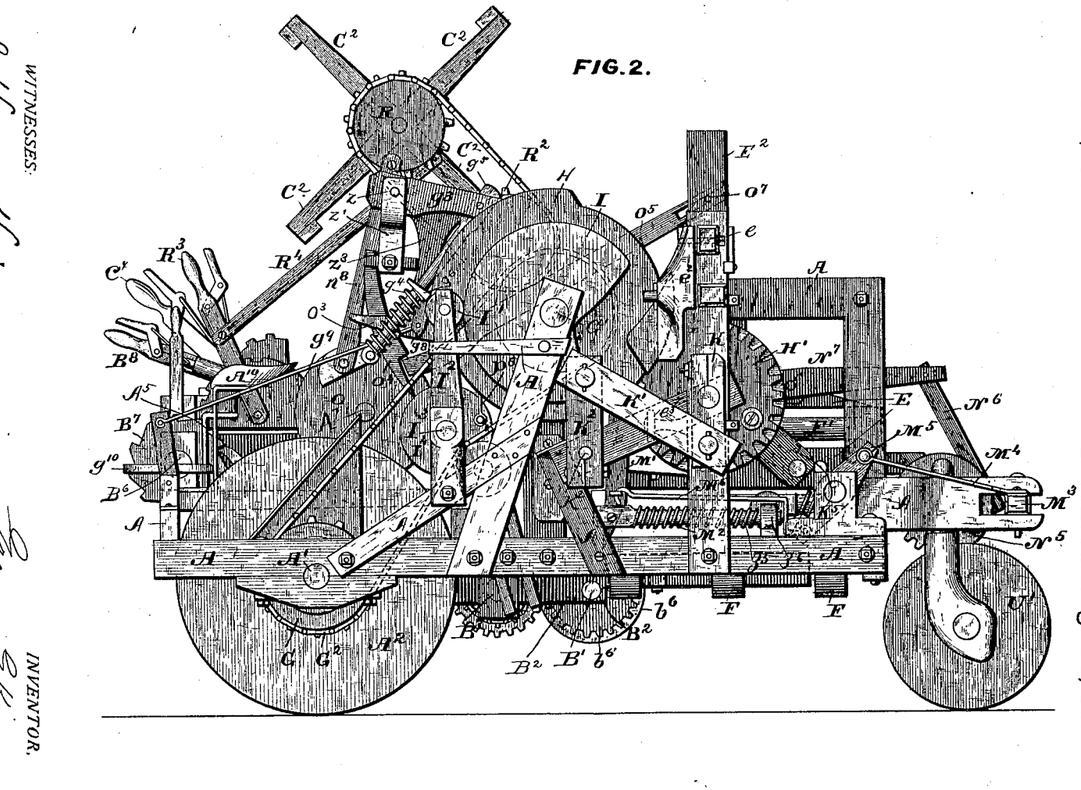
Fig. 2 is a side elevation of the same.
Figure 3:
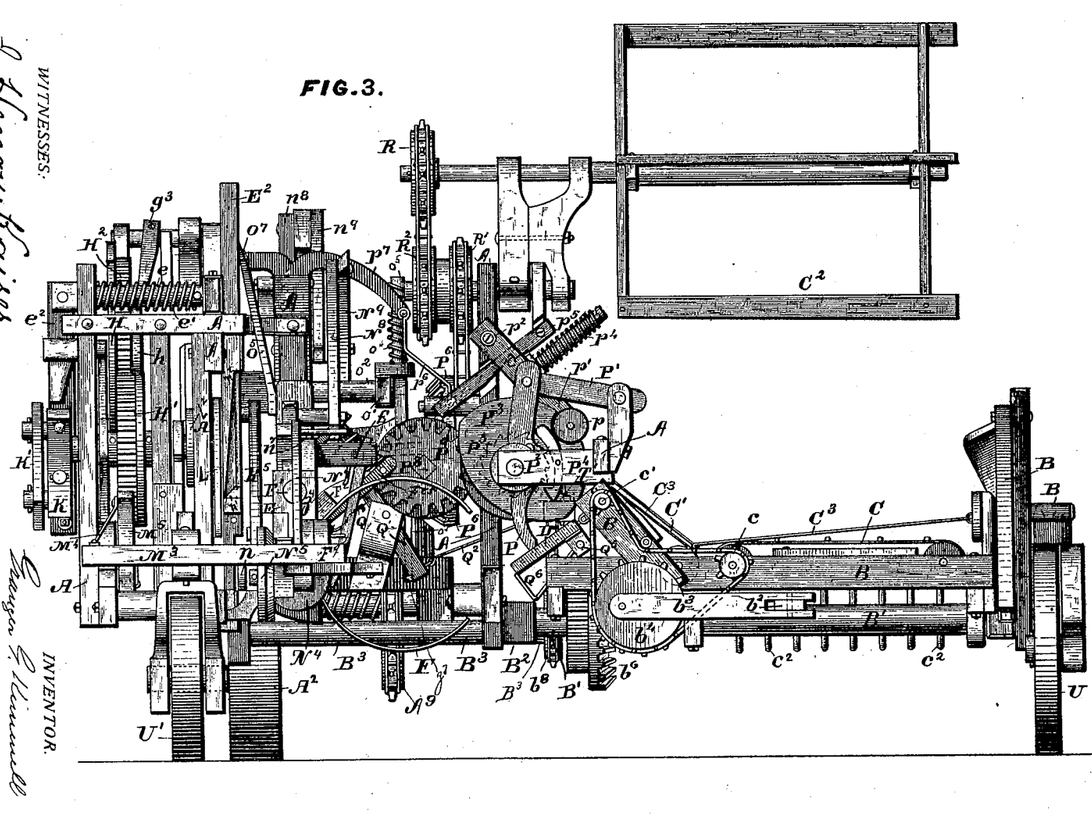
Fig. 3 is a rear elevation.

B indicates the frame carrying the cutting mechanism, which frame is pivoted on a shaft $B'$, carried in the end of a beam $B^2$, which latter is in turn pivoted on a shaft $B^3$, Figs. 2 and 3, on the main frame A. The forward end of the beam $B^2$ is elevated or depressed by a rope $B^4$, passing around a pulley $B^5$, Figs. 1 and 12, at the bottom of the frame A and connected to a drum $B^6$, having a handle for the driver and a pawl and ratchet-wheel $B^7$ to prevent its backward rotation. The object of the beam is to enable the whole cutter and conveyer frame to be elevated or depressed bodily should occasion require. The frame B has a forward extension $B^x$, Fig. 1, at the left, which is connected to the main frame A by a link and hand-lever $B^8$, which enables the frame B to be tilted down at front or back with the shaft $B'$ as a center, thereby throwing the cutter nearer to or farther from the ground and also changing to a limited degree the angle of the cut.

Figures 4, 4A, 10:
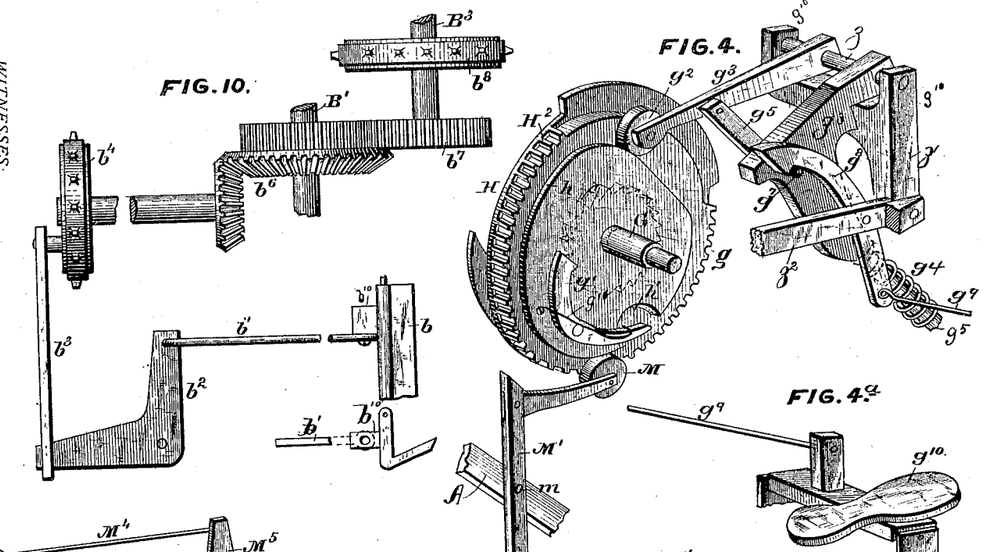

Referring particularly to Figs. 1 and 10, it will be seen that the cutter consists of a long knife or blade $b$, angular in cross-section or having its pivotal points elevated so as to swing in an upward circle, the stalks being thereby severed with a forward and upward cut, peculiarly efficacious in cutting corn. A link $b'$ is connected to a lug $b^{10}$ on the knife, and extends back to the rear of the cutter-frame, where it is connected to a bell-crank lever $b^2$, deriving its motion from a sprocket-wheel $b^4$ through the medium of a connecting-rod $b^3$. The sprocket-wheel is on a shaft driven through the medium of the bevel and straight gears $b^6$ $b^7$, sprocket-wheel $b^8$ on the shaft $B^3$ in turn driven from the secondary operating-shaft $A^7$, deriving its motion direct from the main shaft $A'$ through the sprocket-wheels $A^8$ $A^9$, respectively, and their chain. The sprocket-wheel $b^4$, besides driving the cutter, also drives the rollers $c$ $c'$, the former constituting the left-hand roller for the horizontal portion of the conveyer, consisting of the belt C and the latter the top roller of the elevating portion $C'$ of the conveyer, the connection between said sprocket-wheel and rollers being formed by a sprocket-chain in the ordinary manner, as shown in Fig. 3. The conveyer-belts are both located in rear of the cutter in position to receive the corn as it is cut and thrown backward by the reel $C^2$ above the cutter, said conveyer-belts C $C'$ being provided with ribs or projections in the ordinary manner; but to prevent any dragging of the stocks, which are individually quite heavy, and also to form a smooth track on which the stalks, can travel a strip of sheet metal $C^3$ is secured to the right-hand end of the cutter-frame and rests over the conveyer-slats with the outer end preferably somewhat higher than the inner end and an inner jointed section which forms the inclined track on the elevating portion of the conveyer.

Supported immediately in rear of and extending out in front of the knife or cutter $b$ is a series of picking-up fingers $c^2$ on a pivoted bar $c^3$, adapted to pick and straighten up any stalks of corn which may be down or inclined very far. The position or inclination of the fingers $c^2$ and the distance between their points and the ground is regulated by the hand-lever $C^4$, connected to the arm $c^5$ on the bar $c^3$ by a link $c^6$, as will be understood from an inspection of Fig. 1.

Figure 6:
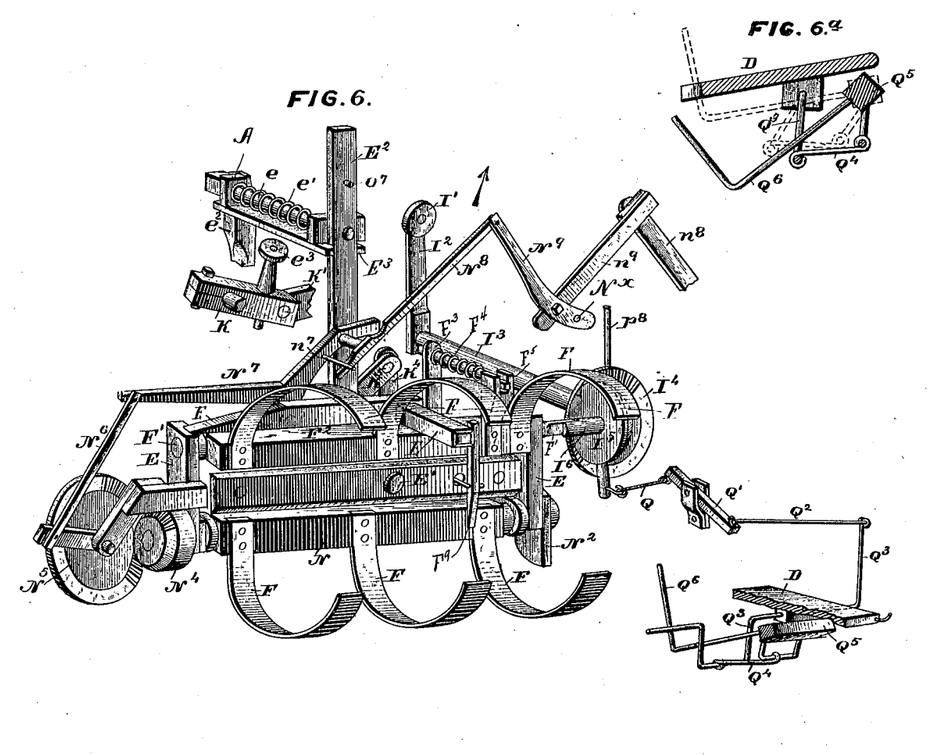
Fig. 6 is a perspective view of the bundling and shocking mechanism, showing some of its connections and a part of the grain-table and retainers.

Returning now to the conveyer, it will be seen that it delivers the stalks onto a feed-table D, Figs. 1, 3, 6, and $6^a$, from which the grain is delivered to the arms F or barrel of the bundling and shocking mechanism, and when the latter is not in position to receive the same it is retained on the table by mechanism, which will be specifically described, with the bundling and shocking mechanism, as it is controlled and operated in certain relations to the latter. The said bundling and shocking mechanism occupies the entire rear left-hand portion of the main frame A, Fig. 1, and consists, broadly stated, of a series of pairs of bundling-arms, or what may be termed a "barrel," which is centrally pivoted and adapted to be turned from a horizontal to a vertical position and when in the latter position to have a limited vertical movement, the grain being delivered into the barrel when in horizontal position, grasped and turned to a vertical position, butts down, then dropped to the ground and discharged from the machine, standing in the form of a shock, which may be surrounded by a band in the ordinary manner unless tied before leaving the machine. The operation of the barrel is preferably partially under the control of the driver, in that the coupling of the operating mechanism and main drive-shaft $A'$ is thrown into operation by him, said mechanism then operating to automatically grasp the bundle, stop the feed of more grain thereto, tilt the barrel, discharge the shock, resume normal position for the reception of more grain, and again throw the feeding mechanism into operation to discharge the grain from the table D into the barrel, all as will now appear.

A sprocket-wheel G on the main drive-shaft communicates motion to a shaft G' by means of a sprocket-chain G² and sprocket-wheel G³, which latter shaft and wheel are therefore constantly rotated when the machine is in motion and has thereon a ratchet-wheel $g$, Fig. 1, which constitutes one member of a clutch adapted to connect the main operating-wheel H of the bundling and shocking mechanism with the driving-shaft, the other member of the clutch being a pawl $g'$ on the wheel H, Fig. 4, adapted to be thrown into operative position by the driver and to be thrown out of operation the proper moments automatically or without the intervention of the driver. To do this the rear end of the pawl normally rests beneath a roller $g^2$ on an arm or lever $g^3$, the roller being adapted to travel on the circumference of a cam $h$ on the wheel H, a recess $h'$ being cut therein to permit the depression of the pawl end, and one side of the cam made irregular to permit the arm to become set, as will now appear. The arm $g^3$ is pivoted upon a short shaft $z$, carried by a yoke $z'$, the latter being rigidly attached to the frame A by a brace or supporting bar $z^2$. A depending bracket $z^3$, also pivoted upon shaft $z$ and consequently moving on the same center with arm $g^3$, is provided at its lower end with a projecting lug or block $g^6$, through which passes a rod $g^5$, secured at its upper end to the arm $g^3$ and bearing on its lower end a spring $g^4$, interposed between block $g^6$ and a suitable stop on the lower extremity of rod $g^5$. The arm $g^3$ is depressed by action of the spring $g^4$, and when, together with the pawl $g'$, it is released said bracket and spring-pressed rod $g^5$ are adapted to move therewith. The spring then being expanded, but in normal position, with the pawl out of engagement, the bracket is held depressed by the catch $g^8$ engaging a pin $g^7$ thereon, and this catch is under the control of the driver through the medium of the rod $g^9$ and foot-treadle $g^{10}$, pivoted at the front of the machine and within convenient reach of the seat $A^{10}$.

Figures 7, 8:
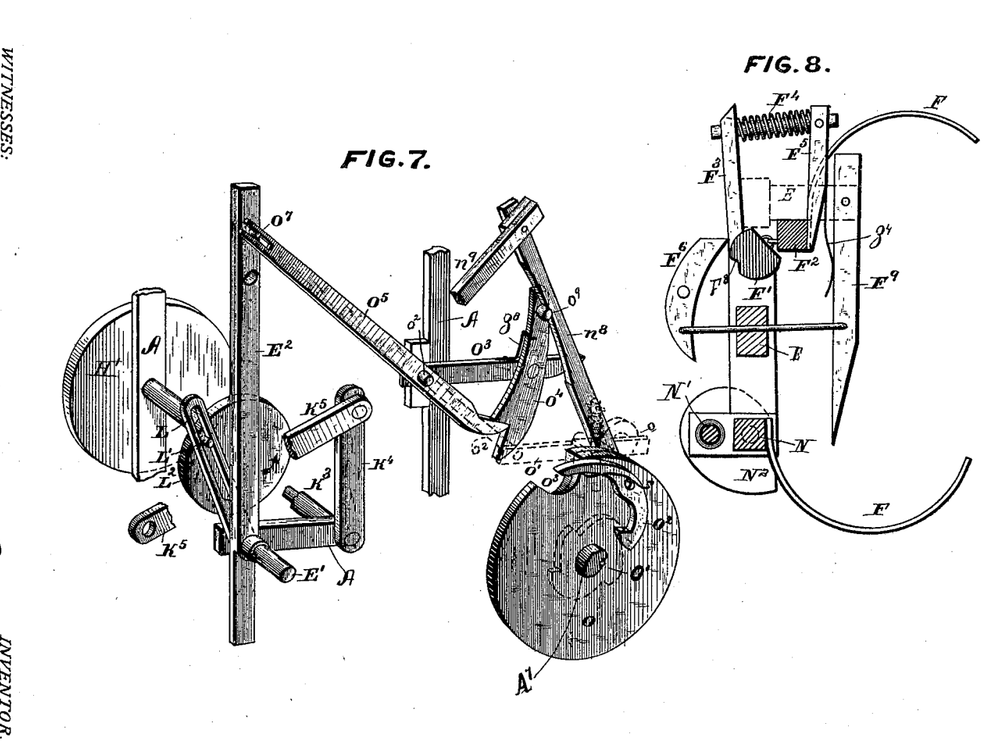
Fig. 7 is a perspective view of the elevating mechanism for the bundler and shocker and of the mechanism for throwing the lower arms open when the shock is dropped to the ground.
Fig. 8 is a detail section of the upper arms of the bundler, showing the lock therefor.

The operation is this: When the treadle $g^{10}$ is moved to release the catch $g^8$, the block $g^6$ and arm $g^3$ are permitted to move out. The tension on the spring $g^{11}$ of the pawl $g'$ being then relieved, the pawl is thrown into engagement by its spring $g^{11}$ and the wheel H rotated, the cam $h$ meanwhile traveling around with the wheel, and when the depressed portion before referred to comes beneath the roller $g^2$ the arm $g^3$ and block $g^6$ are depressed by their own weight sufficiently to permit the catch $g^8$ and pin $g^7$ to re-engage, and as the cam continues to rotate the spring $g^4$ is thrown under tension and the roller $g^2$ is caused to enter the depression $h'$ and throw the pawl $g'$ out of operation as soon as the wheel H has made a complete revolution. When the barrel is horizontal, the lower arms are locked in the position shown in Fig. 3 and the initial movement of the main wheel H is utilized to close and lock the upper arms down to grasp and hold the bundle firmly, such step being accomplished through the medium of the outside cam I, Fig. 2, on which travels the roller I' on the end of arm I², connected to shaft I³, having gear-wheel I⁴, Fig. 6, thereon, which gears with a corresponding bevel-gear I⁵, having a stud-axle I⁶, with a slot therein for the reception of the end of the shaft F', controlling the upper arms of the barrel. The said arms are directly connected to a secondary shaft or base F², hinged to the shaft F', and when the shaft F' is turned by the said mechanism in a direction to grasp the bundle the arm F³, Fig. 8, thereon, through the medium of the spring F⁴ and arm F⁵ on the base F², presses the arms down, the spring compensating for any irregularities in the size of the bundle. When the shaft F' is so rotated, a catch F⁶ engages a notch F⁸ in its rear surface and holds it in such position, said catch being operated by the lever F⁹ within the barrel and adapted to be pressed into engagement by the bundle of corn, but to remain out of operation unless a bundle is present, in the latter case acting under influence of a light leaf-spring $z^4$, bearing upon the rear of lever F⁹, between which and the frame E it is interposed for the purpose of retaining the catch E⁶ normally out of engagement, as shown by Fig. 8. This puts the barrel in condition for being tilted vertically; but it has been necessary to arrest the feed of grain at the moment the arms F are closed, the mechanism for accomplishing which is operated from the wheel I⁴, and will be hereinafter specifically described. A second wheel H' is in position to gear with the mutilated gear H² on the wheel H and is started in its movement the moment the arms F are closed and through the medium of the crank K, connecting-rod K', and crank K², Fig. 2, causes the shaft K³ to oscillate, one revolution of the wheel H' causing a complete oscillation of the shaft, which corresponds to and causes a similar movement of the whole frame E, having the barrel or bundler thereon, the shaft K³ being connected to the said frame by the crank and link K⁴ K⁵, respectively, Figs. 6 and 7. Frame E is pivoted at the center on a stud-axle E', carried by a vertically-moving bar or frame E², preferably mounted in bearings E³ in the main frame A to slide, and when the frame E and barrel have reached a vertical position the bar or frame E² is released and the shock dropped to the ground and discharged in standing position. Said bar is held elevated by the bolt or lock $e$, pushed forward by the spring $e'$ and retracted by the little pivoted lever $e^2$ and anti-friction wheel $e^3$ on the crank K, which reaches the lever at the proper moment, or when the frame and barrel have assumed an upright position. The pivot or stud-axle projects radially from the side of the barrel and is located to one side of the plane of movement of same. Thus there is no obstruction to the free turning of the barrel. The lever $e^2$, after being pushed in, retains that position until the frame E is again raised, thus avoiding contact with the crank K. When the frame E and barrel are dropped, the lower arms F must necessarily swing open toward the rear to discharge the shock, and, assuming for the time being that the mechanism for accomplishing this has been operated, it will be noted that to the rear of the bar $E^2$ is pivoted a slotted link L, through the slot of which passes a crank-pin L' on a disk-wheel $L^2$ on the shaft of the wheel H' and rotating in unison therewith, by means of which the bar $E^2$ and frame E, carried thereby, are elevated again by the continued rotation of the wheel. The first half of the rotation carries the pin L' to the bottom of the slot in link L, at which time the frame E drops, moving the link down on the pin. Then as the second half-revolution of the disk $L^2$ occurs the pin L' engages the upper end of the slot in link L and elevates the bar $E^2$ and frame E until the bolt $e$ drops into place and holds them.

Figure 5:
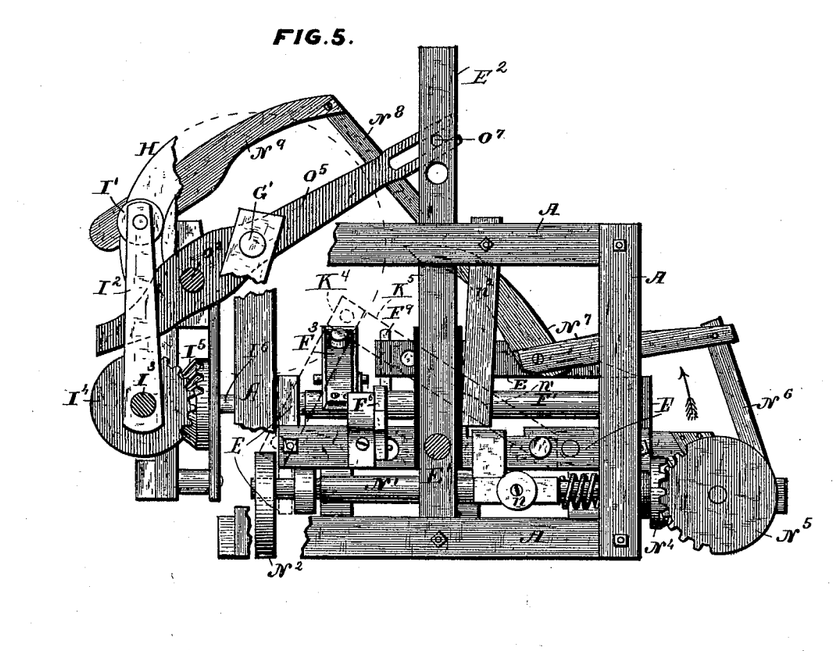
Fig. 5 is a rear elevation of the bundling and shocking mechanism and supporting-frame therefor.

Referring to Fig. 4 particularly, it will be seen that besides the wheel $g^2$ there is a second wheel M riding on the cam $h$, said wheels being arranged on diametrically-opposite sides of the shaft G', the latter being mounted on the end of a lever M', pivoted at $m$ and held upon the periphery of cam $h$ by action of the spring $M^2$ in position to enter the recess $h'$ and arrest the drive-wheel H when it has made exactly a one-half revolution. Spring $M^2$ encircles a sliding rod $z^5$, which finds a bearing at one end in a lug $z^6$, permanently attached to the left-hand outside longitudinal sill of frame A, through which lug said rod $z^5$ projects. The opposite or front end of rod $z^5$ is provided with an enlargement or collar, against which spring $M^2$ abuts, and at this end is swiveled to the lower end of lever M'. The mechanism before described as operated by this wheel M is so proportioned and adjusted as that the first half-turn of the wheel H moves the barrel to the point where the shock is discharged, at which moment the wheel M throws the pawl $g'$ out and arrests the movement, and the discharged shock itself is relied on to again start the mechanism, insuring the complete removal of the shock from a position where it might interfere with the return of the barrel or other mechanism to its first position. This is accomplished by interposing a lever or arm $M^3$ in a position to be struck by the shock as the machine is drawn forward, said lever being connected by suitable links, &c.—such as rod $M^4$, reversing-lever $M^5$, and rod $M^6$—with the lever M', thereby throwing the wheel M out and permitting the pawl $g'$ to engage and rotate the wheel H the remaining half-revolution. The lower arms F of the barrel or bundler are connected rigidly to the shaft N, pivoted at each end in the frame E and held in position with the arms up by the spring-pressed bolt N', the end of which enters a seat in the plate $N^2$ on the inner end of the shaft N. On the rear face of this bolt N' is secured a small stud or wheel $n$, which as the barrel and frame E turn to vertical position passes above the shoulder $n'$ (shown in Fig. 3 and by dotted lines, Fig. 5) on the downwardly-extending arm $n^3$, secured on the main frame A, and as the barrel and frame E are dropped the stud or wheel $n$ comes in contact with said shoulder, withdraws the bolt N', and permits the arms F to fly open and the shock to pass out.

To insure the opening of the arms and their return to normal position, the shaft N is provided at its rear end with a bevel-gear $N^4$, which meshes with a similar gear $N^5$, journaled in the frame E and having an arm connected by a link $N^6$, pivoted to the long arm of the bell-crank lever $N^7$, pivoted on the frame E. The short arm of the bell-crank lever is jointed to a rod $N^8$, connected at its opposite end to a lever $N^9$, pivoted on the main frame A of the machine. Secured to and projecting at right angles from the lever $N^7$ is a pin $n^7$, which engages the lower end of the rod $N^8$ when the barrel is thrown to a horizontal position and the arms are in their normal position. The arms are returned to their position when the barrel and frame are turned back to their normal position. The movement of the barrel when it is turned toward its normal position forces the pin $n^7$ against the lower end of the rod $N^8$ and the rod $N^8$ and short arm of the lever $N^7$ are then incapable of passing a substantially parallel line, so that as the pin $n^7$ tends to draw down the short end of lever $N^8$ there is a direct radial pull on the pivot of link $N^9$. This pivot, being fixed to the frame A, cannot move, so that as the barrel is turned down the engagement of the pin $n^7$ with the lower end of rod $N^8$ raises the long end of the lever $N^7$ and actuates the gear $N^5$ through the medium of link $N^6$. The movement of gear $N^5$ turns the gear $N^4$, which revolves the shaft N, thus returning the arms to their normal position. When the barrel is turned up into vertical position and the bar $E^2$ has dropped, the parts last above described occupy the position shown in Fig. $6^b$, and from this figure as well as from the others it will be seen that on the same pivot with the lever $N^9$ is mounted a lever $n^9$, which is connected by a link or rod $n^8$ to a wheel O, journaled loosely on the left-hand end of the secondary drive-shaft $A^7$. A rotation of the wheel O, it will be seen by pulling the rod $n^8$ down, would cause the lever $n^9$ to bear on the pin $N^x$ on the lever $N^9$, and the latter through the bell-crank lever $N^7$ and connections described (see Figs 6 $6^b$) would cause the gears $N^4$ $N^5$ to rotate in a direction to throw the arms F wide open for the discharge of the shock. This movement will be readily understood by referring to Fig. $6^b$, in which it will be seen that as the short arm of the bell-crank lever is drawn up the long arm will be moved toward the rear and the gears rotated. However, the pin $N^x$ does not engage the lever $n^9$, and the above action does not take place until the barrel has been turned to a vertical position and dropped by the withdrawal of the pin $e$.

To cause the mechanism for throwing the lower arms F open to operate at the proper moment, it is made dependent upon the dropping of the barrel and frame E, with their supporting-bar $E^2$, as follows: Referring to Fig. 7, it will be seen that a ratchet-wheel $O'$ is mounted on and rotates with the secondary driving-shaft $A^7$, and on the wheel O is a pawl $O^2$, adapted to engage such ratchet-wheel, but normally held out of engagement by the little roller $o$ on the end of an arm $o'$, rigidly connected to the shaft $o^2$ and held down in the recess $o^3$ in the wheel O by the spring $o^4$, Figs. 1, 3, and 7, bearing thereon and surrounding a rod $o^5$, connected to the frame A by bolts, as at $z^7$, Fig. 3. To the opposite end of the shaft $o^2$ is rigidly connected an arm $O^3$, bearing on its end the spring-pressed latch $O^4$, adapted to rest on the short arm of the lever $O^5$, pivoted at $o^2$, and connected to the vertically-moving frame or bar $E^2$ by the slot and pin $O^7$, whereby as the bar $E^2$ descends with the barrel the latch $O^4$ and arm $o'$ are lifted by action of the lever and the pawl $O^2$ is permitted to engage the ratchet-wheel $O'$ under the influence of its spring. As the connecting-rod $N^8$ descends it moves the arms F of the barrel, as aforesaid, and to place the latch $O^4$ and roller $o$ in position to check the wheel O when it has made a revolution, the said rod engages a pin $o^9$ on the upper end of the latch $O^4$ and disengages the latch from the end of lever $O^5$, permitting the spring $o^4$ to assert itself and the arm $o'$ to be drawn down when it disengages the pawl $O^2$. By further revolutions of the wheel O pressure of rod $N^8$ on pin $o^9$ is relieved and latch $O^4$, under the influence of its spring $z^8$, is immediately returned to its normal position, as shown by Fig. 7, where it re-engages the short arm of lever $O^5$, ready when the bar $E^2$ rises to repeat the operation.

Returning now to the mechanism for feeding or holding the corn on the grain-table D, and referring particularly to Figs. 1, 3, 6, and $6^a$, it will be seen that above the table is mounted a pair or series of feeding blades or fingers P, pivotally connected to the frame A at the upper ends by links $P'$ and mounted on the cranks of a crank-shaft $P^2$, driven from the main shaft $A'$ in the following manner and operating to move the ends of the fingers P forward through the slots in the table D to discharge the grain thereon into the barrel. At the inner end the shaft $P^2$ is provided with the cam-disk $P^3$, having thereon a pawl $P^4$, adapted to engage with a ratchet-wheel $P^5$, driven constantly from the secondary drive-shaft $A^7$, through the medium of the bevel-gears $P^6$ $P^7$, shaft $P^8$, and cog-wheels $P^9$, one on the shaft $P^8$ and the other carrying the said ratchet-wheel $P^5$. During all the time that the bundle is being formed the feeding-fingers P are in rapid motion, but are adapted to be arrested by the release of the pawl $P^4$. Riding on the cam-disk is an anti-friction roller $p$ on the end of an arm $p'$, pivoted to the frame A at $p^2$, on which pivot is also a block $p^3$, carrying a spindle surrounded by a spring $p^4$, Figs 1 and 3, and on said block is a pin or projection, with which the catch $p$ is adapted to engage to hold the roller $p$ in position to release the pawl $P^4$, the arrangement being in all essential particulars the same as that described with reference to Fig. 4 for throwing the wheel H into operation. Normally the catch $p^5$ is held out of position to engage the pin on the block $p^3$ by the link $p^6$, lever $p^7$, and link $p^8$, connected to the wheel $I^4$, Fig. 6, although an opportunity for engagement is offered each time the depressed part of the cam passes, at which point both the arm $p'$ and block $p^3$ are lowered sufficiently for the catch $p^5$ to engage. When the wheel $I^4$ is moved, however, to lower the upper arms F of the barrel, it drops the catch $p^5$ and the feeders P are at once disconnected and the feeding stopped until the entire operation has been completed, the shocker returned to a horizontal position, and its arms F again opened, ready for the reception of more stalks, fed to them from table D by the feeders P, as before described. Besides stopping the feed, the wheel $I^4$, operating through bevel-gear $I^5$, with which it meshes, also moves the arrester-arms $Q^6$ into position, as illustrated in dotted lines, Fig. $6^a$, by means of the link Q, lever $Q'$, link $Q^2$, and crank-shaft $Q^3$, which is journaled beneath the table D and has its cranks connected by links $Q^4$ to arms on the shaft $Q^5$, carrying the arrester-arms $Q^6$. When the wheel $I^4$ is turned, it operates on this mechanism to project the arms $Q^6$ above the table and absolutely arrest any grain, and there is no possibility of the escape of any of the grain until the arms $Q^6$ are lowered, which occurs in the reverse of the order mentioned, the arms being withdrawn just as the feeders P start and give the released grain a good impetus. It will be observed that where the shaft $F'$ disengages from the slot in stud $I^6$, the wheel $I^5$ and stud remain in the same position until the return of the shaft to horizontal position. Hence the shaft $F'$ always enters the vertical slot without trouble. Then as the cam I revolves the shaft is turned and the arms opened just prior to the starting of the feeders.

Figure 9:
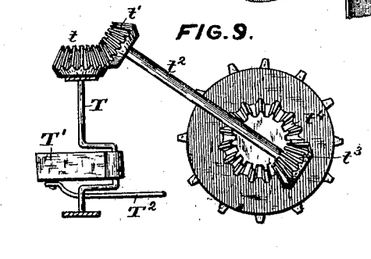
Fig. 9 is a detail of the butter or device for straightening the butts of the stalks.

To straighten up the bottom of the stalks so as to form a shock with a regular base plane, I employ what I term a "butter" $T'$, which consists, simply, of a paddle-like structure reciprocated and adapted to strike the butt-ends of the stalks as they pass over the table D. This device is shown in detail in Fig. 9, wherein it will be seen that a vertical shaft T is provided with a crank, to which one end of the butter $T'$ is connected, said butter being pivoted at an intermediate point on a link $T^2$ and occupying a position directly across the end of the table D. The upper end of the shaft is provided with a bevel-gear $t$, with which meshes the gear $t'$ on the shaft $t^2$, driven by the gears $t^3 t^4$, the latter on the end of the supplemental drive-shaft $A^7$.

In constructing the present machine the usual guards are employed to guide the corn to the cutter $b$ and the reel $C^2$, before referred to, is employed to throw the corn back onto the platform and conveyer C. The reel is driven from the secondary shaft $A^7$ by the sprocket-wheels R R' and $R^2$ and their chains, said reel being mounted on arms pivoted on the same center as the sprocket-wheels $R^2$, through which the power from the chains is transmitted. Hence the reel may be raised and lowered readily by the hand-lever $R^3$ and link $R^4$.

With a mechanism such as herein described it is proposed to cut two rows of corn at one time and to stand the same in shocks, the size and relative distance apart of which may be regulated by the driver, the spring-pressed upper arms of the barrel permitting the size to be varied within certain limits without materially affecting the grip on the bundle.

In the preferred construction of machine but one ground-wheel $A^2$ is employed and the weight is distributed between this wheel and the caster-wheels U and U', the former located at the outer side of the conveyer-platform B and the latter at the rear end of the main frame A, although it is obvious that the main drive-shaft A' may be provided with another large wheel, should it appear advisable for any reason, and while I have shown and described herein certain specific forms of mechanism and combinations of parts for performing the various steps in the complete harvesting of corn—that is to say, cutting, bundling, and standing in shocks—it is obvious that the mechanical details may be varied considerably without departing from the spirit of my invention.

Having thus described my invention, what I claim as new, and desire to secure by Letters Patent, is—

1. In a corn-harvester, the combination, with the bundling or shocking mechanism, substantially as described, and the cutter, of the conveyer for transferring the corn from the cutter to the bundling mechanism and a flexible band of sheet metal overlying said conveyer, resting thereon and forming a smooth way, along which the corn travels, substantially as described.

2. In a corn-harvester, the combination, with the pivoted bundling and shocking mechanism, substantially as described, the intermittingly-operated wheel co-operating with the arms when in a horizontal position to open or close the barrel, and the cutter and conveyer for transferring the corn from the cutter to the bundling and shocking mechanism, of the feed-table over which the corn passes, the movable arms adapted to project above the feed-table to interrupt the feed, and connections between said arms and the intermittingly-operated wheel, whereby the feed is arrested when the barrel is closed, substantially as described.

3. In a corn-harvester, the combination, with the main drive-shaft, bundling or shocking mechanism, cutter, conveyer, and feed-table, of the feed-fingers connected to a crank-shaft carrying a cam and pawl, a constantly-moving ratchet-wheel driven from the main drive-shaft and with which the pawl engages, and the pivoted arm carrying the anti-friction roller riding on the cam for releasing the pawl, said arm being released by the bundling or shocking mechanism, whereby the movements of the feed-fingers may be arrested when the bundling and shocking mechanism is not in position, substantially as described.

4. In a corn-harvester, the combination, with the main drive-shaft, bundling or shocking mechanism, cutter, conveyer, feed-table, feed-fingers, crank-shaft to which the fingers are connected, and pawl and cam on said shaft, of the constantly-moving ratchet-wheel with which the pawl engages driven from the main shaft, the spring-pressed arm for throwing the pawl out of engagement, the spring for holding said arm in operative position, and the catch controlled by the bundling or shocking mechanism for maintaining the tension on said spring, substantially as described.

5. In a corn-harvester, the combination, with the main drive-shaft, bundling or shocking mechanism, cutter, conveyer, feed-table, feed-fingers, crank-shaft to which the fingers are connected, and pawl and cam on said shaft, of the constantly-moving ratchet-wheel driven from the main drive-shaft, with which the pawl engages, the pivoted spring-pressed arm carrying the anti-friction roller for throwing the pawl out of engagement, the spring for holding the said arm in operative position, the pivoted block on which said spring is mounted, and the catch controlled by the bundling and shocking mechanism for holding said block in with the tension on the spring, substantially as described.

6. In a corn-harvester, the combination, with the main drive-shaft, bundling or shocking mechanism, cutter, conveyer, feed-table, feed-fingers, pivoted links on which the fingers are mounted and crank-shaft to which said fingers are connected, and pawl, of the constantly-moving ratchet-wheel driven from the main drive-shaft, with which the pawl engages, the pivoted spring-pressed arm carrying the anti-friction roller for throwing the pawl out of engagement, the spring for holding the arm in operative position, the pivoted block on which the spring is mounted, the catch engaging said block moved by the bundling and shocking mechanism, and the cam on the crank-shaft having the recess and depressed portions, as described, and forming the track for the anti-friction roller, substantially as described.

7. In a corn-harvester, the combination, with the main drive-shaft and bundling or shocking mechanism, of the main operating-wheel for said mechanism, having connections with the drive-shaft, a clutch interposed in said connections, an arm for disengaging the clutch and then holding it disengaged, said arm adapted to be released by the driver, a second arm or lever for disengaging said clutch at a different point in the revolution of said operating-wheel and holding it disengaged, and a lever interposed in the path of the discharged shock at the rear of the machine for releasing said second arm or lever, substantially as set forth.

8. In a corn-harvester, the combination, with the main drive-shaft and bundling and shocking mechanism, of the main operating-wheel for said mechanism, having connections with the drive-shaft, a clutch interposed in said connections, a yoke rigidly secured to the main frame, having a shaft to which is pivoted an arm for disengaging said clutch and then holding it disengaged, a depending bracket secured to said shaft and provided with a lug through which passes a rod having a spring connection with the bracket and connected to said clutch-releasing arm, and a catch whereby said bracket is locked, said catch being released by the driver, substantially as described.

9. In a corn-harvester, the combination, with the main drive-shaft and the bundling or shocking mechanism, of the main operating-wheel for said mechanism, carrying a cam having a recess, a clutch interposed between the drive-shaft and said main operating-wheel, and an arm for disengaging said clutch, having an anti-friction roller running on the cam, a spring for pressing the roller into the recess for releasing the clutch, and a latch under the control of the driver for holding the spring compressed, substantially as described.

10. In a corn-harvester, the combination, with the cutting and conveying mechanism and drive-shaft, of the barrel formed by the oppositely-arranged clamping-arms mounted on a common base pivoted at the center on a horizontal pivot at one side of the plane of movement of the barrel, and connections, substantially as described, between said barrel and drive-shaft for turning the same on its center, substantially as described.

11. In a corn-harvester, the combination, with the cutting and conveying mechanism and drive-shaft, of the barrel formed by the oppositely-arranged clamping-arms mounted on a common base pivoted at the center, a vertically-movable bar carrying said pivot, and connections, substantially as described, between the barrel and drive-shaft for turning the same on its center, as and for the purpose set forth.

12. In a corn-harvester, the combination, with the cutting and conveying mechanism and drive-shaft, of the barrel formed by the oppositely-arranged clamping-arms mounted on a common base pivoted at the center, connections between said barrel and drive-shaft for turning the same on its center, a vertically-movable bar or frame carrying the pivot for the barrel, a lock for holding the bar elevated, and connections, substantially as described, between the bar and drive-shaft for elevating the same, as and for the purpose set forth.

13. In a corn-harvester, the combination, with the cutting and conveying mechanism, drive-shaft, and centrally-pivoted barrel, of the vertically-movable bar or frame carrying the pivot for the barrel, the lock for holding the bar or frame elevated, the shaft driven from the main drive-shaft, having the crank-pin thereon, the link on the bar engaging the pin to elevate the bar during one part of the revolution of the shaft, and a lever tripped by an arm on the shaft to release the lock during another part of the revolution, substantially as described.

14. In a corn-harvester, the combination, with the cutting and conveying mechanism, drive-shaft, and centrally-pivoted barrel, of the shaft driven from the main drive-shaft and the crank-arm and link moved thereby to rotate the barrel on its center, substantially as described.

15. In a corn-harvester, the combination, with the cutting and conveying mechanism, drive-shaft, and centrally-pivoted barrel, of the shaft driven from the main drive-shaft, the rock-shaft connected to said shaft by the double crank and link K K² K′, respectively, whereby the rock-shaft is oscillated, a crank-arm on said rock-shaft, and a link connecting said arm and barrel, whereby the latter is moved from a horizontal to a vertical position and back again, substantially as described.

16. In a corn-harvesting machine, the combination, with the cutting and conveying mechanism, drive-shaft, centrally-pivoted barrel, and main drive-wheel for the bundling mechanism of the shaft, having a gear thereon meshing with said drive-wheel, of the vertically-movable bar or frame carrying the pivot of the barrel, the link connected to said bar and engaging a crank-pin moved by the shaft, an oscillating shaft and double crank and link connection between said shafts, and a crank-arm and link connecting the rock-shaft and barrel, substantially as and for the purpose set forth.

17. In a corn-harvester, the combination, with the centrally-pivoted barrel, main operating-wheel for turning the same on its pivot, main drive-shaft from which said wheel is driven, a clutch for transmitting motion from the drive-shaft to the operating-wheel, an arm $g^3$ for releasing said clutch and holding it disengaged while the barrel is in a horizontal position, a catch $g^8$ for said arm, a lever M′ for automatically releasing the clutch and then holding it disengaged when the barrel has turned to vertical position, and an arm M³, projecting into the path of the discharged bundle for withdrawing said clutch-releasing lever, substantially as described.

18. In a corn-harvester, the combination, with the drive-shaft, cutter, and conveyer, of the barrel for receiving the corn, having the oppositely-arranged clamping-arms pivotally mounted on their base, the lock for the lower arm, and the spring for holding the upper arm down, substantially as described.

19. In a corn-harvester, the combination, with the drive-shaft, cutter, and conveyer, of the barrel for receiving the corn, having the oppositely-arranged clamping-arms pivotally mounted on their frame, the lock for the lower arm, the spring for holding the upper arm down, and the latch for holding said spring compressed, substantially as described.

20. In a corn-harvester, the combination, with the drive-shaft, cutter, and conveyer, of the barrel for receiving the corn, having the oppositely-arranged clamping-arms, the lower arms being pivotally mounted on the supporting-frame, a shaft interposed between the upper arms and said frame, a spring between said shaft and arms for holding the arms down, and a latch for holding the shaft in said last-named position, substantially as described.

21. In a corn-harvester, the combination, with the drive-shaft, cutter, conveyer, and pivoted barrel for receiving and standing the corn on end, of the shaft controlling the upper arms of said barrel, the stud having the slot therein, with which said shaft engages, and the cam on the main operating-wheel for turning said stud, substantially as described.

22. In a corn-harvester, the combination, with the drive-shaft, cutter, conveyer, and pivoted barrel having the oppositely-arranged pivoted arms, of the gear on the lower arms, the bell-crank lever connected to the main frame for closing the arms when in horizontal position, and the gear $N^5$ and link $N^6$, connecting said lever and gear, substantially as described.

23. In a corn-harvester, the combination, with the drive-shaft, cutter, conveyer, and pivoted barrel having the oppositely-arranged pivoted arms, of the gear on the lower arms, gear $N^5$, meshing therewith, the bell-crank lever $N^7$, connected to said gear $N^5$, link $N^8$, connected thereto, lever pivoted on the main frame and connected to the link, and the lever driven from the main shaft for opening the arms when in vertical position, substantially as described.

24. In a corn-harvester, the combination, with the drive-shaft, cutter, conveyer, and pivoted barrel having oppositely-arranged pivoted arms, of the catch for holding the upper arms depressed, and the lever controlling said catch lying within the barrel, whereby the corn within the barrel throws the catch into operative position, substantially as described.

GRANGER G. KIMMELL.

Witnesses:
ROBERT R. MILLER,
E. B. OPDYCKE.